(12) United States Patent
Corwin et al.

(10) Patent No.: US 7,952,997 B2
(45) Date of Patent: May 31, 2011

(54) CONGESTION MANAGEMENT GROUPS

(75) Inventors: Michael Corwin, Sunnyvale, CA (US); Joseph Chamdani, Santa Clara, CA (US); Stephen Trevitt, Gormley (CA)

(73) Assignee: MCDATA Corporation, San Jose, CA (US)

( * ) Notice: Subject to any disclaimer, the term of this patent is extended or adjusted under 35 U.S.C. 154(b) by 987 days.

(21) Appl. No.: 11/437,389

(22) Filed: May 18, 2006

(65) Prior Publication Data
US 2007/0268829 A1 Nov. 22, 2007

(51) Int. Cl.
*H04J 3/14* (2006.01)
(52) U.S. Cl. ............ 370/229; 370/230; 370/230.1; 370/231; 370/232; 370/235
(58) Field of Classification Search .......... 370/229, 370/230, 230.1, 231, 232, 233, 234, 235, 370/235.1, 236, 236.1, 412, 413, 414, 416, 370/418, 252, 350, 351, 352, 392, 396, 400, 370/401; 709/223, 224, 225, 226, 234, 235
See application file for complete search history.

(56) References Cited

U.S. PATENT DOCUMENTS

| | | | |
|---|---|---|---|
| 5,090,011 A | 2/1992 | Fukuta et al. | |
| 5,115,433 A | 5/1992 | Baran et al. | |
| 5,274,631 A | 12/1993 | Bhardwaj | |
| 5,305,311 A | 4/1994 | Lyles | |
| 5,390,173 A | 2/1995 | Spinney et al. | |
| 6,147,969 A * | 11/2000 | Benmohamed et al. | 370/230 |
| 6,594,234 B1 * | 7/2003 | Chard et al. | 370/236 |
| 6,625,160 B1 * | 9/2003 | Suzuki | 370/413 |
| 6,657,962 B1 * | 12/2003 | Barri et al. | 370/235 |
| 6,690,668 B1 * | 2/2004 | Szczepanek et al. | 370/392 |
| 7,145,914 B2 * | 12/2006 | Olarig et al. | 370/413 |
| 7,453,810 B2 * | 11/2008 | Zoranovic et al. | 370/236 |
| 7,631,096 B1 * | 12/2009 | Yeh et al. | 709/235 |
| 2003/0035374 A1 * | 2/2003 | Carter et al. | 370/235 |
| 2003/0043742 A1 * | 3/2003 | De Maria et al. | 370/230 |
| 2003/0076781 A1 * | 4/2003 | Enomoto et al. | 370/229 |

(Continued)

OTHER PUBLICATIONS

CNT Introduces New Generation Storage Networking Infrastructure, at http://web.archive.org/web/20050206034944/www.cnt.com/cnt/news/pr/2004/07-19-00, 3 pages, © 2003-2005, printed Jul. 19, 2006.

(Continued)

*Primary Examiner* — Aung S Moe
*Assistant Examiner* — Abdullah Riyami
(74) *Attorney, Agent, or Firm* — Hensley Kim & Holzer, LLC

(57) ABSTRACT

A scalable solution to managing congestion in a network is disclosed. In one implementation, such a solution comprises a means for managing traffic including at least one flow monitor and a plurality of flow control regulators that together manage congestion within a network. Each of the flow control regulators monitor traffic at a corresponding ingress point and determine a state of the ingress point corresponding to the traffic monitored at the ingress point. Each flow control regulators forward the state (or information representative of the state) to the flow monitor. The flow monitor detects congestion based upon the states of the flow control regulators and, in the event of congestion, determines a target bandwidth for the ingress points. The flow monitor provides a control signal to at least one of the flow control regulators, and at least one of the flow control regulators control flows at its corresponding ingress point based upon the control signal received from the flow monitor.

34 Claims, 7 Drawing Sheets

U.S. PATENT DOCUMENTS

| | | | | |
|---|---|---|---|---|
| 2003/0126297 | A1* | 7/2003 | Olarig et al. | 709/250 |
| 2005/0157752 | A1* | 7/2005 | Takase et al. | 370/468 |
| 2006/0013133 | A1* | 1/2006 | Peng et al. | 370/230 |
| 2006/0098572 | A1* | 5/2006 | Zhang et al. | 370/229 |
| 2006/0203725 | A1* | 9/2006 | Paul et al. | 370/229 |
| 2006/0206579 | A1* | 9/2006 | Connor et al. | 709/214 |
| 2006/0245356 | A1* | 11/2006 | Porat et al. | 370/232 |
| 2006/0250959 | A1* | 11/2006 | Porat | 370/230 |
| 2007/0153697 | A1* | 7/2007 | Kwan et al. | 370/235 |
| 2007/0201499 | A1* | 8/2007 | Kapoor et al. | 370/412 |
| 2007/0223372 | A1* | 9/2007 | Haalen et al. | 370/229 |
| 2007/0253438 | A1* | 11/2007 | Curry et al. | 370/412 |
| 2008/0019388 | A1* | 1/2008 | Harmon et al. | 370/412 |
| 2008/0212472 | A1* | 9/2008 | Musacchio et al. | 370/232 |

OTHER PUBLICATIONS

Cisco MDS 9000 Family of Multilayer Directors and Fabric Switches, at http://www.cisco.com/en/US/products/ps6446/prod_brochure0900aecd80355d56.html, 3 pages, © 1992-2005, printed Jul. 19, 2006.

Cisco MDS 9000 Family Networked Storage Solutions for Small and Medium-Sized Businesses—At-a-Glance, 2-page product brochure, © 1992-2005 Cisco Systems, Inc.

DStar: CNT Remains FICON Leader with UltraNet Multi-Service Director, at http://www.taborcommunications.com/dsstar/04/1109/109456.html, 2 pages, printed Jul. 19, 2006.

CD/9000 Channel Director—Product Detail by CNT, at http://web.archive.org/web/20050204044510/www.cnt.com/products/switching/cd9000, 2 pages, © 2003-2005, printed Jul. 19, 2006.

FC/9000 Fibre Channel/FICON Director—Product Detail by CNT, at http://web.archive.org/web/20050205081213/www.cnt.com/products/switching/fc9000, 3 pages, © 2003-2005, printed Jul. 19, 2006.

McData—Intrepid® 6140 Director, product brochure, 2 pages, © 2006 McData Corporation.

McData— Intrepid® 10000 Director, product brochure, 2 pages, © 2006 McData Corporation.

Schroeder, Michael D. et al., "Autonet: a High-speed, Self-configuring Local Area Network Using Point-to-point Links," Digital Equipment Corporation, SRC Research Report, Apr. 21, 1990, 43 pages.

* cited by examiner

CONGESTION MANAGEMENT GROUPS

TECHNICAL FIELD

The invention relates generally to managing traffic flows in a switched system and, more particularly, to managing congestion in a switched system.

BACKGROUND

A network, such as a local area network (LAN), a wide area network (WAN), or a storage area network (SAN), typically comprise a plurality of devices that may forward information to a target device via at least one shared communication link, path, or switch. Congestion may occur within the network when a total offered load (i.e., input) to a communications link, path, or switch exceeds the capacity of the shared communications link, path, or switch. During such congestion, design features of the link, path, switch, or network may result in unfair and/or undesirable allocation of resources available to one device or piece of data at the expense of another.

A SAN, for example, may be implemented as a high-speed, special purpose network that interconnects different kinds of data storage devices with associated data servers on behalf of a large network of users. Typically, a SAN includes high-performance switches as part of the overall network of computing resources for an enterprise. The SAN is usually clustered in close geographical proximity to other computing resources, such as mainframe computers, but may also extend to remote locations for backup and archival storage using wide area network carrier technologies.

The high-performance switches of a SAN comprise multiple ports and can direct traffic internally from a first port to a second port during operation. Typically, the ports are bi-directional and can operate as an input port for information received at the port for transmission through the switch and as an output port for information that is received at the port from within the switch for transmission away from the switch. As used herein, the terms "input port" and "output port," where they are used in the context of a bi-directional switch, generally refer to an operation of the port with respect to a single direction of transmission. Thus, each port can usually operate as an input port to forward information to at least one other port of the switch operating as an output port for that information, and each port can also usually operate as an output port to receive information from at least one other port operating as an input port.

Where a single output port receives information from a plurality of ports operating as input ports, for example, the combined bandwidth of the information being offered to the switch at those input ports for transmission to a designated port operating as an output port for that information may exceed the capacity of the output port itself or some internal resource of the switch and lead to congestion. Where the switches comprise a hierarchy of internal multiplexers, switches, and other circuit elements, such congestion may lead to an unfair and/or undesirable allocation of switch resources to information received at a particular input versus information received at another input.

A global scheduler that operates as a master arbiter for a switch has been used to deal with unfairness caused by the switching architecture during congested operation. Such a scheduler monitors all the input ports and output ports of the switch. The scheduler also controls a common multiplexer to prioritize switching operations across the switch and achieve a desired allocation of system resources. Since the scheduler monitors and controls every input and output of the switch, the scheduler is not scalable as the number of resources within the switch increases. Rather, as more and more resources or other components are added to a switch, the complexity of the scheduler increases exponentially and slows the response time of the switch.

SUMMARY

A scalable solution to managing congestion in a network is provided. In one implementation, such a solution comprises a means for managing traffic including at least one flow monitor and a plurality of flow control regulators that together manage congestion within a network. Each of the flow control regulators monitor traffic at a corresponding ingress point and determine a state of the ingress point corresponding to the traffic monitored at the ingress point. Each flow control regulator forwards the state (or information representative of the state) to the flow monitor. The flow monitor detects congestion based upon the states of the flow control regulators and, in the event of congestion, determines a target bandwidth for the ingress points. The flow monitor provides a control signal to at least one of the flow control regulators, and at least one of the flow control regulators control flows at its corresponding ingress point based upon the control signal received from the flow monitor.

In some implementations, articles of manufacture are provided as computer program products. One implementation of a computer program product provides a computer program storage medium readable by a computer system and encoding a computer program.

BRIEF DESCRIPTIONS OF THE DRAWINGS

DETAILED DESCRIPTION

Figure 1:
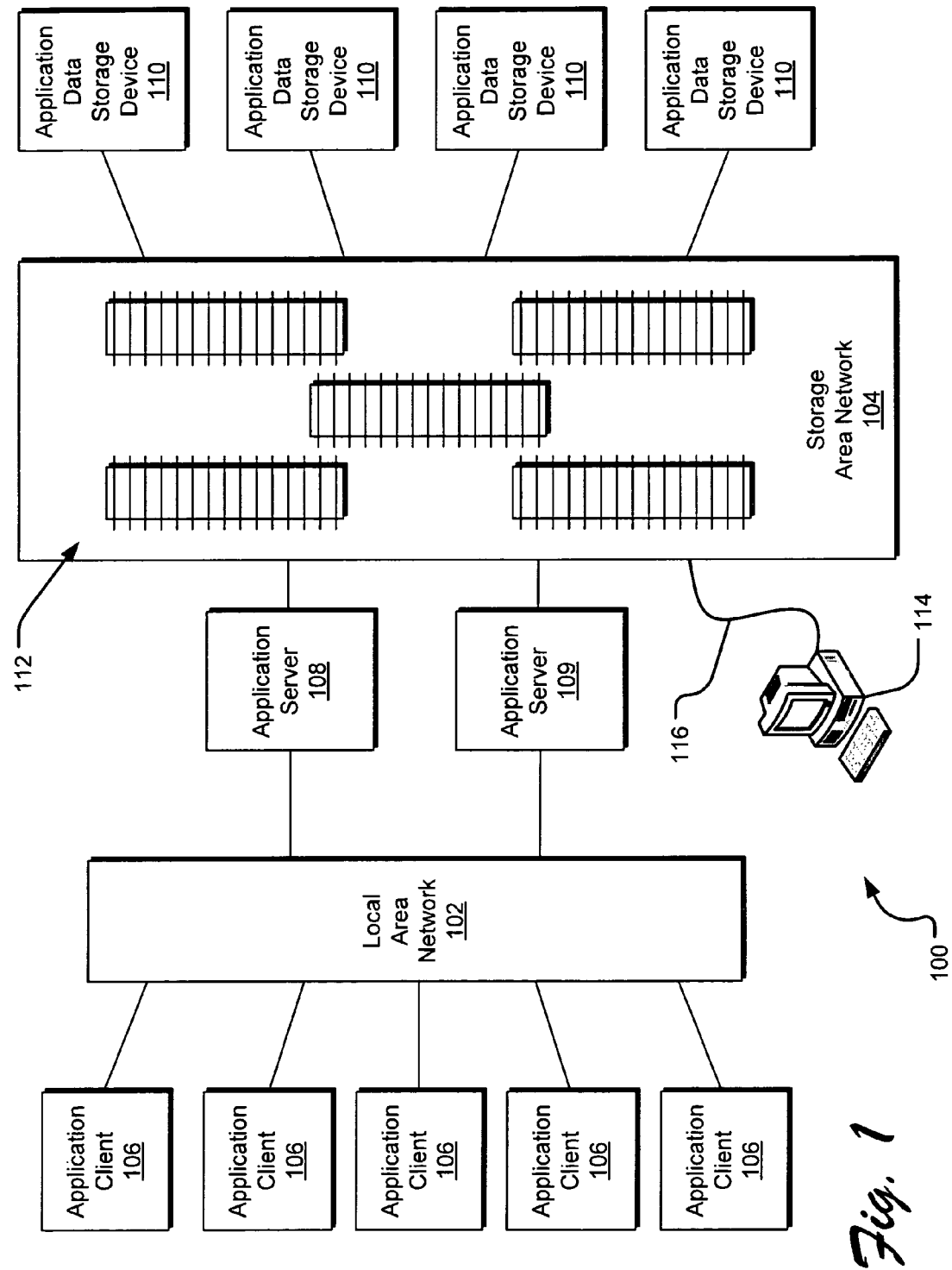
FIG. 1 illustrates an exemplary computing and storage framework including a local area network (LAN) and a storage area network (SAN).

FIG. 1 illustrates an exemplary computing and storage framework 100 including a local area network (LAN) 102 and a storage area network (SAN) 104. Various application clients 106 are networked to application servers 108 and 109 via the LAN 102. Users can access applications resident on the application servers 108 and 109 through the application clients 106. The applications may depend on data (e.g., an email database) stored at one or more application data storage device 110. Accordingly, the SAN 104 provides connectivity between the application servers 108 and 109 and the application data storage devices 110 to allow the applications to access the data they need to operate. It should be understood that a wide area network (WAN) may also be included on either side of the application servers 108 and 109 (i.e., either combined with the LAN 102 or combined with the SAN 104).

Within the SAN 104, one or more switches 112 provide connectivity, routing, and other SAN functionality. Some of the switches 112 may be configured as a set of blade components inserted into a chassis, as rackable or stackable modules, or the like. The chassis, for example, may comprise a back plane or mid-plane into which the various blade components, such as switching blades and control processor blades, are inserted. Rackable or stackable modules may be interconnected using discrete connections, such as individual or bundled cabling.

In the illustration of FIG. 1, the LAN 102 and/or the SAN 104 comprise a means for managing fairness during congestion. As will be described in more detail below, the means for managing fairness comprises at least one flow monitor and a plurality of flow control regulators that together manage congestion within a network. Each of the flow control regulators monitor traffic at a corresponding ingress point and determine a state of the ingress point corresponding to the traffic monitored at the ingress point. Each flow control regulators forward the state (or information representative of the state) to the flow monitor. The flow monitor detects congestion based upon the states of the flow control regulators and, in the event of congestion, determines a target bandwidth for the ingress points. The flow monitor provides a control signal to at least one of the flow control regulators, and at least one of the flow control regulators control flows at its corresponding ingress point based upon the control signal received from the flow monitor.

The computing and storage framework 100 may further comprise a management client 114 coupled to the switches 112, such as via an Ethernet connection 116. The management client 114 may be an integral component of the SAN 104, or may be externally to the SAN 104. The management client 114 provides user control and monitoring of various aspects of the switch and attached devices, including without limitation, zoning, security, firmware, routing, addressing, etc. The management client 114 may identify at least one of the managed switches 112 using a domain ID, a World Wide Name (WWN), an IP address, a Fibre Channel address (FCID), a MAC address, or another identifier, or be directly attached (e.g., via a serial cable). The management client 114 therefore can send a management request directed to at least one switch 112, and the switch 112 will perform the requested management function. The management client 114 may alternatively be coupled to the switches 112 via one or more of the application clients 106, the LAN 102, one or more of the application servers 108 and 109, one or more of the application data storage devices 110, directly to at least one switch 112, such as via a serial interface, or via any other type of data connection.

Figure 2:
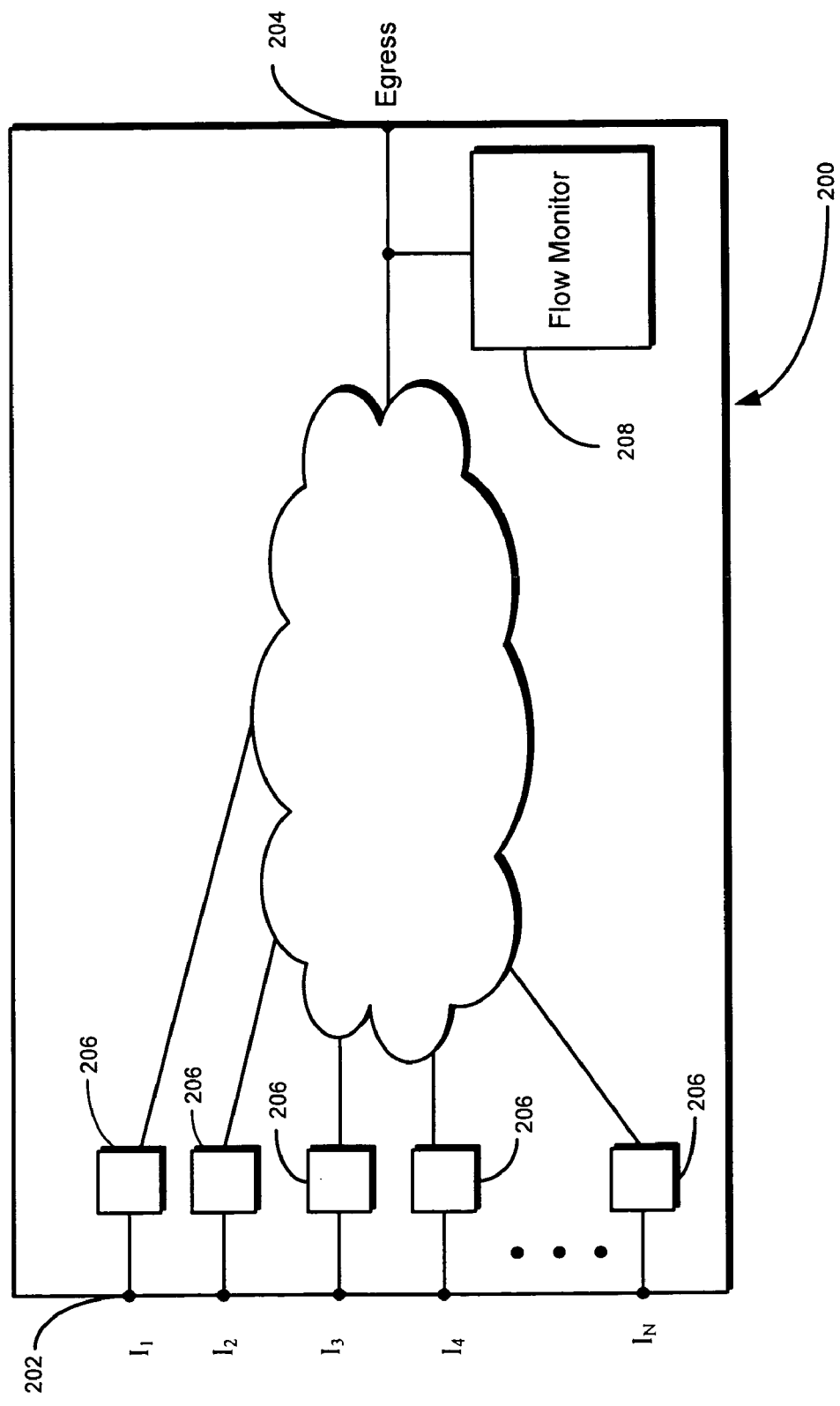
FIG. 2 illustrates an exemplary switching stage comprising a means for managing fairness during congested traffic conditions.

FIG. 2 depicts a congestion-prone stage 200 of the computing and storage framework and a means for managing fairness in that stage during congestion conditions. "Fairness" generally refers to allocating system resources between inputs or ingress points in a discriminating manner. For example, the multiple flows may be allocated generally equal resources for passing information through the stage. Alternatively, one or more ports may be allocated greater or lesser resources, such as by prioritizing or weighting the individual ports. For example, in a switch stage, high priority ports may be allocated as many resources as necessary to forward information received at those ports directly to a desired output port without allowing other ports to reduce the bandwidth of the high priority ports. Medium priority ports may be allocated an equal or weighted share of resources not being used by the high priority ports, even if the bandwidth of at least one of these input ports must be reduced. Finally, flows through low priority ports may be turned off or dropped during congested traffic conditions and transmitted to the output port when the stage is not undergoing congested traffic conditions.

The stage 200 of the computing and storage framework may comprise, for example, a portion of a LAN or a SAN. In the embodiment shown in FIG. 2, for example, the stage 200 may comprise a switch of a SAN, although the stage 200 may comprise a sub-set of the switch, a combination of multiple switches, the entire SAN, a sub-set of a LAN, or the entire LAN. The stage 200 may, for example, comprise any combination of communication links, paths, switches, multiplexers, or any other network components that route, transmit, or act upon data within a network.

The stage 200 comprises a plurality of ingress points 202 (e.g., $I_1$ through $I_N$) and at least one egress point 204. The ingress points 202, for example, may comprise a plurality of ports of a switch operating as input ports, and the at least one egress point may comprise a port of the switch operating as an output port. Each ingress point 202 and egress point 204 receives and transmits any number of "flows." Each flow, for example, may comprise a uniquely identifiable series of frames or packets that arrive at a specific ingress point 202 and depart from a specific egress point 204. Other aspects of a frame or packet may be used to further distinguish one flow from another and there can be many flows using the same ingress point 202 and egress point 204 pair. Each flow may thus be managed independently of other flows.

Each of the ingress points 202 is connected to a flow control regulator 206 that tracks the bandwidth offered at the ingress point 202 and/or the actual bandwidth being transmitted to the stage from the ingress points 202. In one implementation, for example, each flow control regulator 206 may comprise at least one buffer, such as a queue, that receives information offered to the stage at a corresponding ingress point 202. The flow control regulators 206 may monitor the bandwidths (or even back-pressure applied to the ingress points 202 from the stage 200), such as by monitoring a number of frames or packets passing through the buffers and/or being held within the buffers to determine a state, described below, of the ingress point 202. If a buffer comprises x frames or packets, where x comprises a predetermined number of frames or packets (e.g., a threshold), the flow control regulator 206 may determine that the bandwidth of information entering the stage 200 from its corresponding ingress point 202 is less than or equal to the bandwidth being offered at that ingress point 202. In one particular implementation, for example, the number of frames or packets being held within a buffer may be averaged over a time period (e.g., 1 to 10 msec) or a predetermined number of frames or packets (e.g., 100 to 1000 frames) instead of making a determination that bandwidth of information entering the stage 200 from its corresponding ingress point 202 is less or equal to than the bandwidth being offered at that ingress point 202 based upon a number of frames or packets present in the buffer at any instantaneous time.

Each flow control regulator 206 also compares the offered bandwidth and/or the actual bandwidth to a target bandwidth assigned to the ingress point 202. From this information, the flow control regulators 206 determine a state (e.g., Restricted, Under Offered, or Limited) of each ingress point 202 and forward the state (or information representative of the state (e.g., a flag) to a flow monitor 208. This state may be transmitted to the flow monitor 208 in-band with the data received at the ingress point 202 (e.g., within a control frame) may be transmitted to the flow monitor 208 out-of-band (e.g., via an alternate communication link), or may be broadcast to one or more flow monitors 208. The flow monitor 208 may be located, for example, at a point of the stage 200 downstream of the flow control regulators 206 (e.g., at the egress point 204 of the stage 200 as shown in FIG. 2) where the state is transmitted to the flow monitor 208 in-band with data received at the ingress point 202, out-of-band from the data received at the ingress point 202, and/or broadcast to the flow monitor 208. The flow monitor 208 may also be located elsewhere in the network (e.g., in an off-line controller) where the state is transmitted out-of-band from the data received at the ingress point 202 and/or broadcast to the flow monitor 208.

The flow control regulators 206 are also adapted to regulate the flow of data received at the ingress point 202 based upon a control signal (e.g., a target bandwidth) received from the flow monitor 208 (e.g., via broadcast via in-band or out-of-band communication or transmitted via out-of-band communication over a feedback link). Where the bandwidth is monitored and averaged over a time period (e.g., 1 to 10 msec) or over a predetermined number of frames or packets (e.g., every 100 or 1000 frames), periodic state updates may be transmitted to the flow monitor 208 for each time period or group of frames, and the flow monitor 208 may broadcast periodic control signals back to at least one of the flow control regulators 206 in response to the periodic state updates. Alternatively, the flow control regulators 206 may forward state updates on an event-driven basis (e.g., at a change in state), and/or the flow monitor 208 may provide feedback signals on an event-driven basis (e.g., change in a target bandwidth for at least one flow control regulator 206). Such embodiments allow for reduced communication bandwidth between the flow control regulators 206 and the flow monitor 208 since the devices are not communicating with respect to each frame.

In the embodiment shown in FIG. 2, the flow control regulators 206 are connected to the flow monitor 208 via internal resources of the stage 200. The flow monitor 208 is also connected to the egress point 204, where the flow monitor detects congestion in the stage (e.g., via the states or information representative of the states forwarded by the flow control regulators 206, actual bandwidth forwarded through the flow control regulators 206, and/or bandwidth measured at the egress point 204 by the flow monitor 208). In such an embodiment, for example, the egress point 204 may correspond to an output port of a switch such that the flow monitor 208 monitors congestion conditions at the output port. In other embodiments, however, the egress point 204 may correspond to a location of the switch upstream of its output port such that the stage 200 corresponds to a portion of the switch and the flow monitor 208 monitors congestion at an internal point of the switch or the egress point 204 may be located external to a switch such that the stage 200 corresponds to resources spanning an output port of a switch and the flow monitor 208 monitors conditions at a point external to the switch and upstream of the output port of the switch. In another embodiment, the flow monitor 208 may be connected to the flow control regulators 206 via off-line resources of the stage 200 and monitor congestion in the stage 200 strictly from information (e.g., ingress applied loads) received from the flow control regulators 206 and not from monitoring flows at the egress point 204 of the stage.

The flow monitor 208 receives the states of at least two of the flow control regulators 206 or information representative of the states of at least two of the flow control regulators 206 (collectively, the "state representative information") and determines whether the stage 200 is congested. The flow monitor 208 also determines a target bandwidth for at least one of the flow control regulators 206 and forwards a control signal (e.g., via an in-band communication or an out-of-band communication, and via a broadcast communication directed to all or a portion of the flow control regulators 206 or a communication directed to each flow control regulator 206 individually) providing the target bandwidth or information representative of the target bandwidth (e.g., a change from a previous target bandwidth) for at least one of the flow control regulators 206 or information representative of the determined target bandwidths for at least one of the flow control regulators 206 (collectively, the "target representative information") to at least one of the flow control regulators 206. The flow monitor 208, for example, may continuously, intermittently (e.g., upon time or frame/packet intervals), or upon a change in operating conditions of the stage 200 calculate a new target bandwidth and provide the target bandwidth to the flow control regulators 206 continuously, intermittently, upon a change in operating conditions, or upon a change in the target bandwidth itself. If the stage 200 is congested, for example, the flow monitor 208 may allow the flow control regulators 206 to maintain their current target bandwidth if the resources of the stage are being fairly allocated or may lower the target bandwidth if the resources are not being fairly allocated. If the stage 200 is not congested, however, the flow monitor 208 may allow the flow control regulators 206 to maintain their current target bandwidths (e.g., if the stage 200 is operating at or near its maximum capacity) or allow one or more of the flow control regulators 206 to increase their target bandwidths (e.g., if the demand on the stage 200 has been lowered).

If the actual bandwidth at an ingress point 202 is less than the offered bandwidth at the ingress point and is also less than the target bandwidth of the ingress point 202 (e.g., determined by the flow monitor 208 or established as an initial target bandwidth), the state of the ingress point 202 may be determined to be "Restricted." In this situation, the input offered at the ingress point 202 is receiving back pressure from the stage 200 (e.g., data offered at the ingress point may be backing up in a buffer at the ingress point or within the stage) and is unable to provide its target bandwidth.

If the actual bandwidth of the ingress point 202 is less than the target bandwidth, but the actual bandwidth is nonetheless equal to the offered bandwidth, however, the state of the ingress point 202 may be determined to be "Under Offered" or "Under Utilized." In this situation, the target bandwidth allocated to the ingress point 202 is under-utilized because the offered bandwidth at the ingress point is less than the percentage of the overall bandwidth of the stage 200 allocated to the ingress point 202, which may be more efficiently utilized at a different ingress point 202 if traffic in the stage 200 is congested.

If the actual bandwidth of the ingress point 202 is equal to the target bandwidth, however, the state of the ingress point 202 may be determined to be "Limited." In this situation, the ingress point 202 is providing the target level of bandwidth assigned to the ingress point, and whether the stage is congested or not does not matter. For example, if the stage 200 is not congested, the ingress point 202 is providing all of its offered bandwidth to the stage 200, while if the stage 200 is congested, the ingress point 202 is providing its fair share of the overall stage bandwidth as determined by the flow monitor 208.

Depending upon the state representative information received by the flow monitor 208, the flow monitor determines whether the target bandwidths of at least one flow control regulator 206 should be altered to achieve fairness in the stage during congested conditions as described below.

Figure 3:
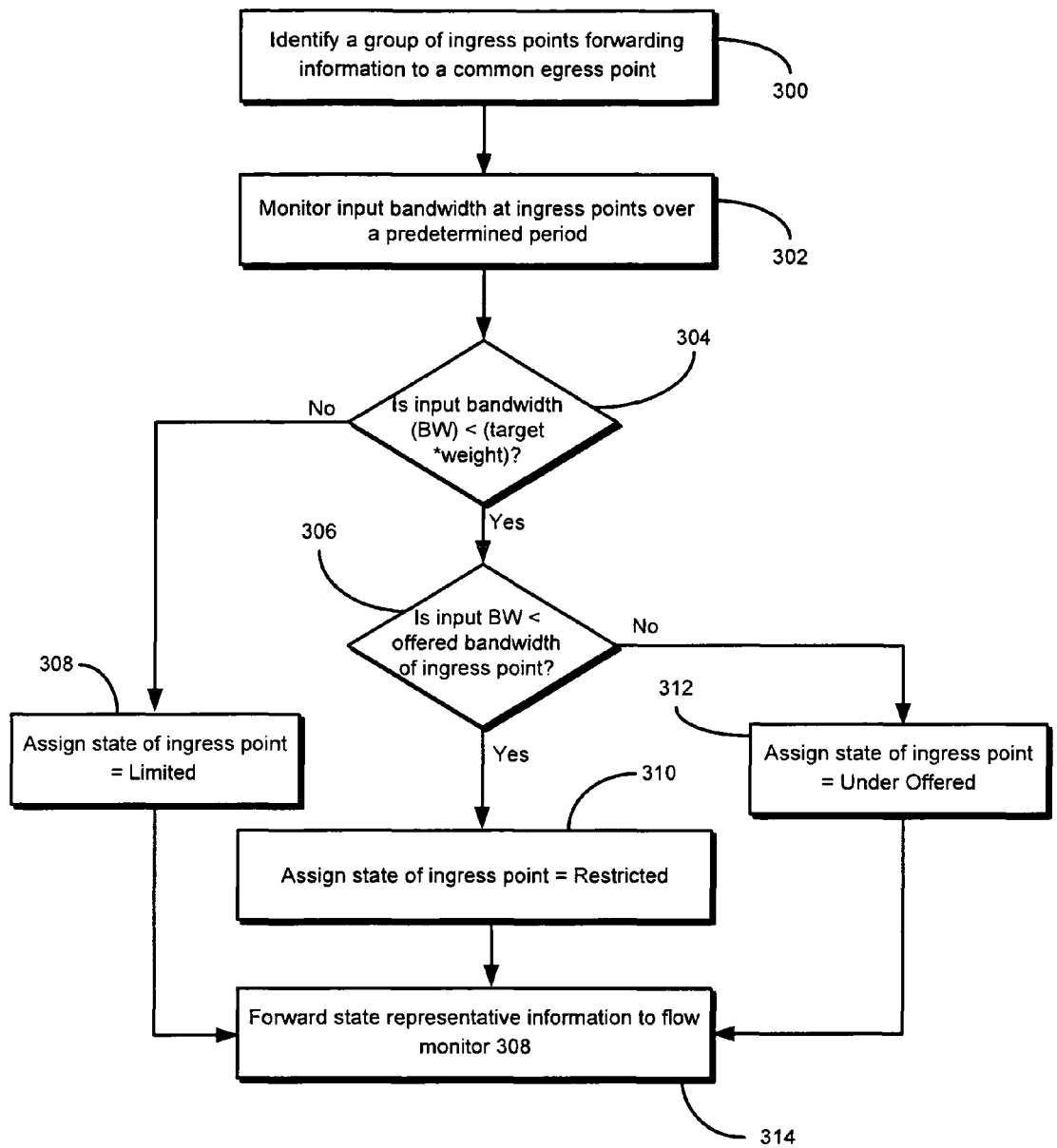
FIG. 3 illustrates operations of a method for determining a state of an ingress point of a stage.
Figure 4:
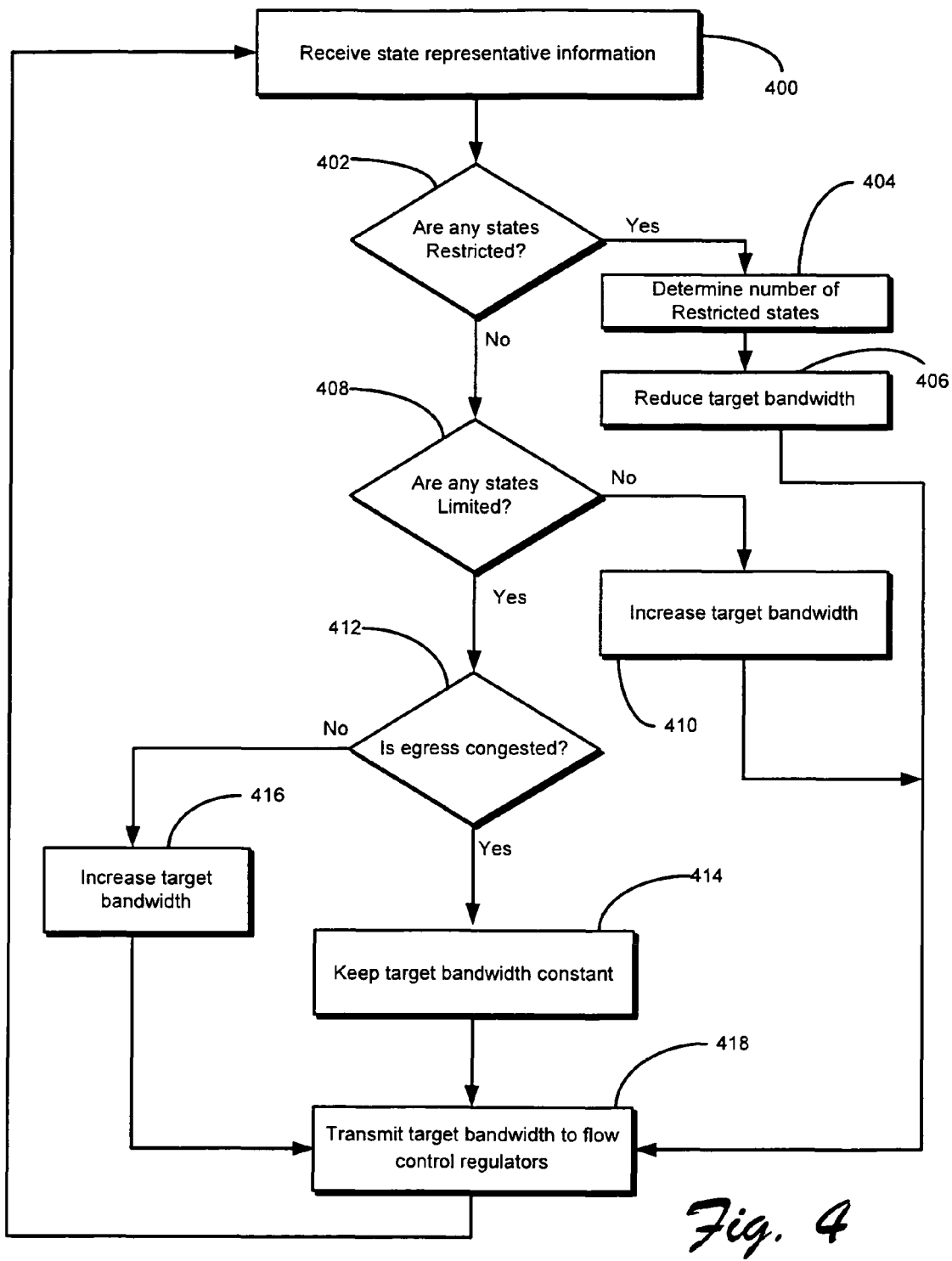
FIG. 4 illustrates operations of an exemplary method for determining a target bandwidth for an ingress point of a stage.
Figure 5:
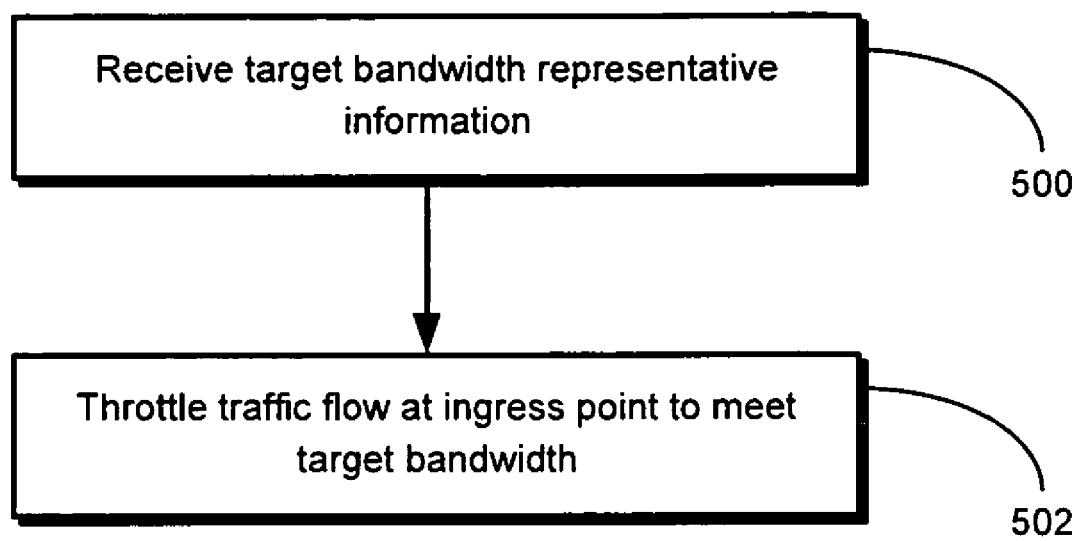
FIG. 5 illustrates operations of an exemplary method for regulating a traffic flow at an ingress point of a stage.

FIGS. 3-5 show operations of an exemplary method for achieving fairness and managing congestion in a network. In FIG. 3, the method determines states of a plurality of ingress points of a stage and forwards state representative information for the ingress points to a flow monitor. In an identifying operation 300, a group comprising a plurality of ingress points that provide information to an egress point is identified. The input received from at least one of the ingress points is controlled via a flow control regulator to achieve fairness as described below. The flow control regulators then monitor the input bandwidth (e.g., offered and/or actual bandwidth) over a predetermined time period or number of frames or packets at a plurality of ingress points within the identified group in a monitoring operation 302.

In decision operation 304, each flow control regulator determines whether the input bandwidth at the corresponding ingress point is less than the product of the assigned target bandwidth (e.g., a percentage of the total bandwidth) and a weight assigned to the particular ingress point. The weights may, for example, be assigned to the individual ingress points based upon the relative priorities of the ingress points. If a first ingress point comprises an input port of a switch that has a guaranteed bandwidth, the ingress point may be assigned a weight to ensure that if the switch traffic is congested, the bandwidth assigned to the port will never be limited below the guaranteed bandwidth. If a second ingress point is less important, however, that ingress point may be assigned a lower weight in order to allow higher priority information received at other ingress points to have a higher relative priority than the information received at the second ingress point. If the input bandwidth of an ingress point is less than the product of the target bandwidth and the weight, the method proceeds to a decision operation 306. If the input bandwidth of an ingress point is not less than the product of the target bandwidth and the weight assigned to the ingress point (i.e., is greater than or equal to the product of the target bandwidth and the weight), the state assigned to the ingress point is Limited in assignment operation 308, and the method proceeds to forwarding operation 314.

At decision operation 306, the flow control regulator then determines whether the actual bandwidth at the ingress point is less than the bandwidth offered to the stage at the ingress point. If the actual bandwidth is less than the bandwidth offered to the stage by the ingress point, the method proceeds to assignment operation 310 where the state assigned to the ingress point is Restricted. If the actual bandwidth is greater than or equal to the bandwidth offered to the stage at the ingress point, however, method proceeds to assignment operation 312 and the state assigned to the ingress point is Under Offered. After a state is assigned to the ingress point in operations 308, 310, or 312, the method proceeds to forwarding operation 314 in which the flow control regulator forwards state representative information (i.e., the actual state or information representative of the state, such as a flag) to the flow monitor.

In FIG. 4, the method receives the state representative information for a plurality of ingress points, determines a target bandwidth, and transmits the target bandwidth to the flow control regulators assigned to the plurality of ingress points. As shown in FIG. 4, the flow monitor receives state representative information from a plurality of flow control regulators corresponding to a plurality of ingress points in reception operation 400. The flow monitor then determines whether any of the ingress points have an assigned state of Restricted in decision operation 402. If any of the ingress points have a Restricted state, the method proceeds to determining operation 404 in which the number of ingress points having a Restricted state is determined and then to reduction operation 406 in which the target bandwidth (e.g., a percentage of the offered bandwidth) is reduced based upon the number of ingress points having a Restricted state.

Typically, when a switch or network is started up or has been idle for a significant time period, the initial target bandwidth is 100%. As needed, the flow monitor may direct the flow control regulators to restrict the bandwidth of at least one ingress point during congestion in order to provide fairness in the system. In a stage having ten ingress points, for example, the target bandwidth may be reduced by 20% from the current target bandwidth if one to three ingress points are Restricted (e.g., reduce the target bandwidth from 100% to 80% or from 75% to 55%), reduced by 40% from the current target bandwidth if four to six ingress ports are restricted (e.g., from 100% to 60% or from 75% to 35%), or reduced by 60% from the current target bandwidth if six to ten ingress ports are restricted (e.g., from 100% to 40% or from 75% to 15%). Thus, in one configuration, the flow monitor may retain the target bandwidth (e.g., in memory, in a register, or the like) from one calculation to the next.

Alternatively, the flow monitor may decrease the target bandwidth without regard to the number of ingress points having a restricted state. For example, the flow monitor may reduce the target bandwidth an equal amount each iteration or may reduce the target bandwidth a first predetermined amount in a first iteration and in decreasing amounts in iterations thereafter until an equilibrium is established. After the new target bandwidth has been determined, the method proceeds to transmission operation 418 below.

One skilled in the art would readily recognize that such a control system could be designed using many different design principles to ensure a stable system in reacting to congestion in the stage. Such design principles also may be used to control how quickly the system converges to stable point by adjusting the target bandwidth and how much error will be allowed during a transition. A stable point in a congested system, for example, may comprise a point where the egress point is operating at a full or substantially full bandwidth level and each ingress point is receiving its "fair" share of that bandwidth.

If none of the ingress points has an assigned Restricted state, the method proceeds from decision operation 402 to decision operation 408. In decision operation 408, the flow monitor determines whether any of the ingress points have an assigned state of Limited. If there are no ingress points having an assigned state of Limited (i.e., all ingress points have an assigned state of Under Offered), the method proceeds to increase operation 410 in which the flow monitor increases the target bandwidth. The target bandwidth, for example, may be increased in steps (e.g., 10%) at a time until the system reaches congestion or the maximum target bandwidth has been reached. This prevents the system from overreacting and placing the stage in congestion where the offering has only slightly lowered. Alternatively, the flow monitor may immediately increase the target bandwidth to the maximum target bandwidth (i.e., 100%). Then, if the increase congests the stage traffic, the system can go lower the target bandwidth in a later iteration to achieve fairness in the stage. After the new target bandwidth has been determined, the method proceeds to transmission operation 418 below. At least two options are incrementally increasing from the current target bandwidth to take advantage of an decrease in offering at one or more ingress point or increasing to the maximum target bandwidth and then determining if the target bandwidth has to be lowered again. Other options may be available to determine smarter switching may also be used, especially where knowledge of offering changes or likelihood of offering changes exists.

If at least one ingress point has a Limited assigned state in decision operation 408, however, the method proceeds to decision operation 412. In operation 412, the flow monitor determines whether there is any congestion at the egress point (e.g., the flow monitor monitors a buffer at the egress point over a period of time or frames and determines that congestion exists if the average number of frames in the buffer during that period meets or exceeds a threshold number). If the flow monitor determines that congestion is occurring at the egress point, the flow monitor keeps the target bandwidth at the same level in assignment operation 414. If the target level is not changed, the flow monitor may merely await the next group of state representative information without transmitting any new information to the flow control regulators, and the method proceeds back to reception operation 400. Alternatively, the method may proceed to transmission operation 418 where the current target bandwidth is transmitted back to the flow control regulators.

If no congestion is determined in decision operation 412, however, the method proceeds to increase operation 416 in which the target bandwidth is increased to take advantage of the unutilized bandwidth available to the stage. The target bandwidth may be increased, for example, using an algorithm, such as $T_{NEW}=T_{CURRENT}+$(Available Egress Bandwidth/Number of Limited Ingress Points), or by a predetermined amount. In this algorithm, for example, the flow monitor determines the available bandwidth at the egress before congestion will occur, and divides this available bandwidth by the number of ingress points that are currently being limited. The amount is then added to the current target bandwidth to obtain the new, increased target bandwidth. The method then proceeds to transmission operation 418 where the new target bandwidth is transmitted to the flow control regulators.

After the new target bandwidth has been transmitted to the flow control regulators in transmission operation 418, the method returns to reception operation 400 and waits. The method, for example, may wait for the next set of state representative information from the flow control regulators, a new sample from one or more of the flow control regulators, a new sample from each flow control regulator, for a period of time, or another indication of a change of operating parameters.

In FIG. 5, the flow control regulators receive the revised target bandwidth from the flow monitor and throttle, if necessary, the flow from the corresponding ingress points to ensure that the flow through the flow control regulators does not exceed the target bandwidth (or the weighted target bandwidth assigned to the ingress point). In reception operation 500, for example, at least one of the flow control regulators receives the target bandwidth from the flow monitor. Then, in throttle operation 502, the flow control monitors throttle the input at their corresponding ingress points, if necessary, to stay within the target bandwidth. In one implementation, for example, each flow control regulator, if necessary, throttles the flow through its corresponding ingress point to a flow of the target bandwidth times the weight assigned to the ingress point.

The methods shown in FIGS. 3-5 are merely exemplary algorithms that may be used to manage congestion in a switched system. FIG. 4, for example, represents one of many possible algorithms for increasing or decreasing the target bandwidth of an ingress point of the stage.

Figure 6:
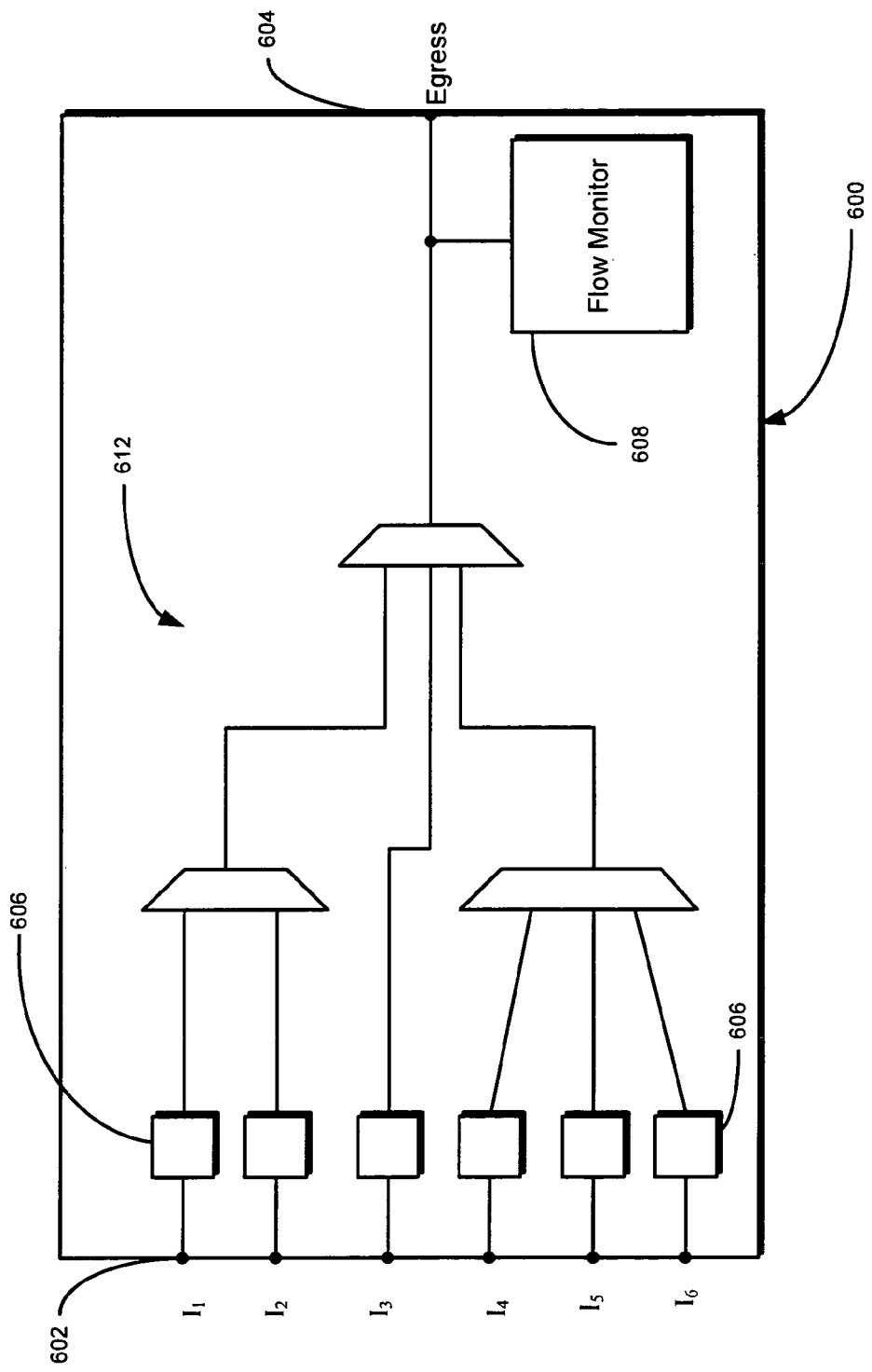
FIG. 6 illustrates another exemplary stage comprising a means for managing fairness during congested traffic conditions.

FIG. 6 shows an embodiment of the present invention in which a stage 600 comprises a hierarchical switch structure 612 of a switch that inherently introduces unfairness between input ports $I_1$-$I_6$ during congested conditions. During congestion in this embodiment, for example, data received at a first input port $I_1$ will receive fewer system resources than data received at another input port $I_3$ fed through fewer switches than the data received at the first input port.

In the embodiment illustrated in FIG. 6, six input ports $I_1$-$I_6$ of a switch comprise ingress points 602 of the stage 600. Each of these ingress points 602 are coupled via a flow control regulator 606 to the hierarchical switch structure 612. As described above with respect to FIG. 2, the flow control regulators 606 monitors the bandwidth offered at each of the ingress points 602 and/or the actual bandwidth being transmitted to the stage at each of the ingress points 602, compares the offered and/or actual bandwidths to a target bandwidth assigned to the ingress point 602, and determines a state (e.g., Restricted, Under Offered, or Limited) for each of the ingress points 602 based upon this comparison. The state or information representative of the state (collectively the "state representative information") is then forwarded to a flow monitor 608. This state representative information may be transmitted to the flow monitor 608 in-band with the data received at the ingress points 602 or out-of-band from the data received at the ingress points 602. Each of the flow control regulators 606 are also adapted to regulate the flow of data received at the ingress points 602 based upon an input (e.g., a target bandwidth) received from the flow monitor 608 (e.g., via a broadcast or feedback link).

In the embodiment shown in FIG. 6, the flow control regulators 606 are connected to the flow monitor 608 via the hierarchical switch structure 612 of the stage 600. The switch structure 612 of the stage 600 is also connected to the output port of the switch at the egress point 604, where the flow monitor 608 detects congestion in the stage 600 (e.g., via the state representative information forwarded by the flow control regulators 606). In this embodiment, the flow monitor 608 is again connected to the output port of the switch to monitor congestion conditions at the output port. In other embodiments, however, the flow monitor 608 may be located within the switch structure 612 of the stage 600 upstream of the output port or external to the stage 600 downstream of the output port in order to monitor congestion.

The flow monitor 608 then receives the state representative information of each flow control regulators 606 and determines whether the stage 600 is congested. If the stage is congested, the flow monitor determines a target bandwidth for each of the flow control regulators 606 and forwards a signal providing target representative information to each flow control regulator 606. If the stage 600 is not congested, however, the flow monitor 608 allows the flow control regulators 606 to maintain the current target bandwidths assigned to them or allows at least one of the flow control regulators 606 to increase its target bandwidth (e.g., up to 100% of its offered bandwidth).

Figure 7:
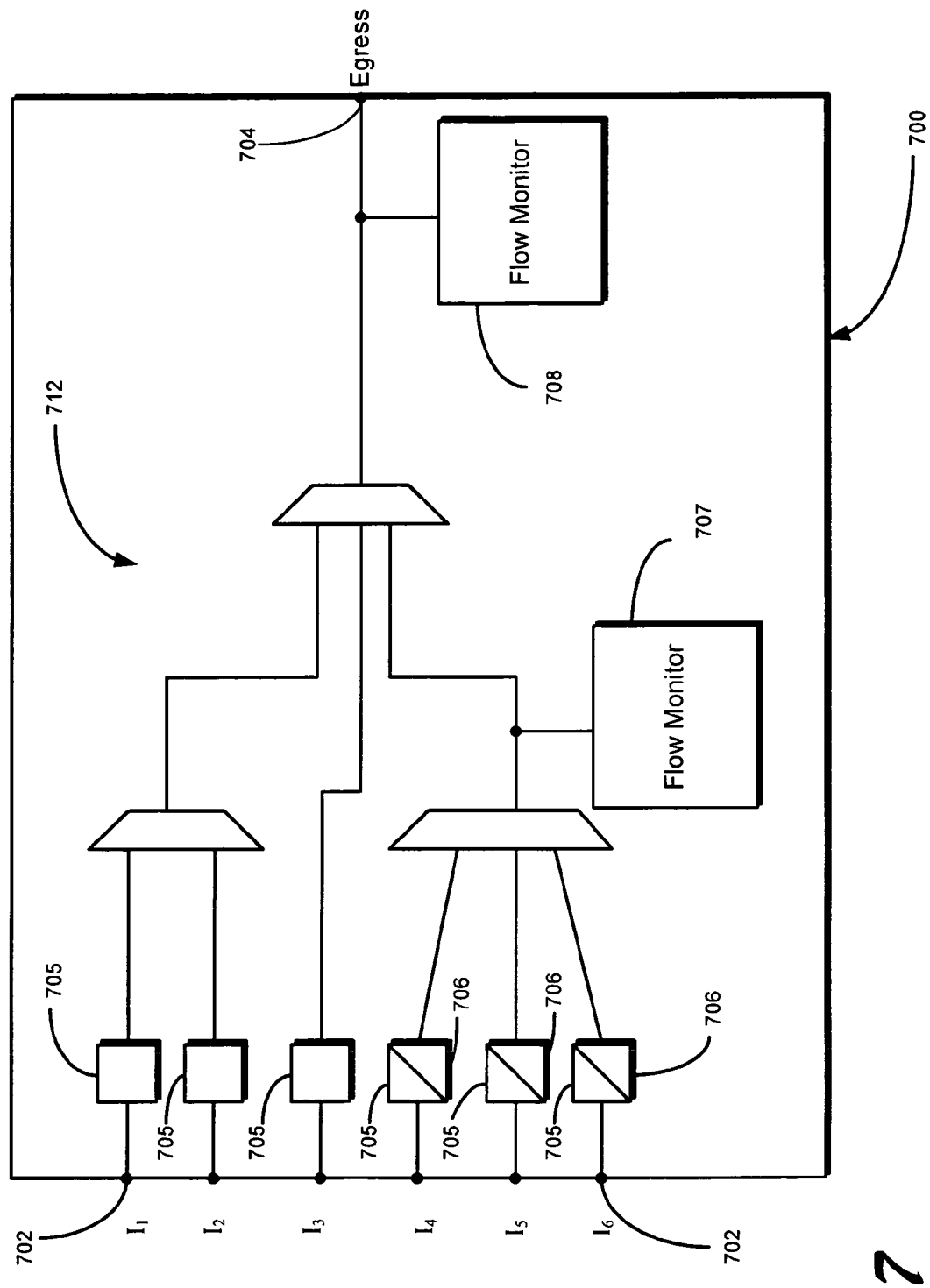
FIG. 7 illustrates yet another exemplary stage comprising a means for managing fairness during congested traffic conditions.

FIG. 7 depicts an embodiment of the present invention in which a stage 700 comprises a hierarchical switch structure 712 of a switch that comprises a multiple-stage flow monitoring system. As described above with respect to the switch 612 shown in FIG. 6, the switch structure 712 of the stage 700 inherently introduces unfairness between input ports $I_1$-$I_6$ during congested conditions. In this embodiment, six input ports $I_1$-$I_6$ of the switch 712 comprise ingress points 702 to the stage 700. Each of these ingress points 702 are connected to the stage 700 via a first flow control regulator 705 and a second flow control regulator 706 disposed in parallel with each other. As described above with respect to FIGS. 2 and 6, the flow control regulators 705, 706 monitor a bandwidth offered at each of the ingress points 702 and/or an actual bandwidth being transmitted to the stage at each of the ingress points 702. The flow control regulators 705, 706 also compare the offered and/or actual bandwidths monitored with a target bandwidth assigned to the ingress points 702, and determine a state for each of the ingress points 702 based upon this comparison. State representative information is then forwarded from the first flow control regulator 705 to a first flow monitor 707 and/or from the second flow control regulator to a second flow monitor 708. This state representative information may be transmitted to the flow monitors 707, 708 in-band with the data received at the ingress points 702 or out-of-band from the data received at the ingress points 702. The flow control regulators 705, 706 are also adapted to regulate the flow of data received at the ingress points 702 based upon an input (e.g., a target bandwidth) received from at least one of the first flow monitor 707 and the second flow monitor 708 (e.g., via a broadcast or feedback link).

In the embodiment shown in FIG. 7, the flow control regulators 705, 706 are connected to at least one of the first flow monitor 707 and the second flow monitor 708 via the switch structure of the stage 700. In this particular implementation, for example, the flow control regulators 705 corresponding to the ingress points $I_1$, $I_2$, and $I_3$ are connected to the second flow monitor 708 via the switch structure 712, and the flow control regulators 705 and 706 corresponding to the ingress points $I_4$, $I_5$, and $I_6$ are connected to the first flow monitor 707 and the second flow monitor 708, respectively, via the switch structure 712. The first flow monitor 707 is connected to the switch structure 712 within the stage 700, and the second flow monitor 708 is connected to an egress point 704 at an output to the stage (e.g., an output port of the switch). The second flow monitor 708 then determines from the state representative information it has received (from the first flow regulator 705 corresponding to the ingress points $I_1$, $I_2$, and $I_3$ and the second flow regulators 706 corresponding to the ingress points $I_4$, $I_5$, and $I_6$) whether the target bandwidths of at least one of the second flow control regulators 706 should be altered to achieve fairness in the stage 700 during congested conditions as described above with respect to FIGS. 2 and 6.

The flow control regulators 705 and 706 each receive target bandwidths from their respective flow monitors 707 and 708. Each regulator 705 and 706 uses the target bandwidth to control the bandwidth of the respective port and assess the current port's status irrespective of the other flow control regulators 705 and 706 requirements. For example, if one regulator is required to limit the bandwidth to meet a target bandwidth, the other regulator observes this as a reduced offered load. This results in the port being restricted to the lesser of the two target bandwidths.

While the implementation shown in FIG. 7 includes individual flow control regulators 705 and 706 corresponding to the individual flow monitors 707 and 708, respectively, a single flow control regulator may instead be used for each ingress point and be able to be controlled by one or both of the flow monitors 707 and 708. In such an implementation, for example, the first flow monitor 707 may control the individual flow control regulators to the exclusion of the second flow monitor 708 if the first flow monitor 707 detects congestion at its portion of the stage, while the first flow monitor 707 may allow the second flow monitor to control the individual flow control regulators if the first flow monitor 707 does not detect congestion at its portion of the stage. In such an implementation, the first flow monitor 707 may collect the state information from the flow control regulators and forward a condensed or summary version representing the combined state of the group of regulators connected to it to the second flow monitor 708. Thus, only a single flow control regulator is required per ingress point 702.

Although the embodiments shown in FIGS. 2, 6, and 7 show multiple ingress points and only a single egress point, other embodiments within the scope of the present invention may be utilized in which at least one of the ingress points shown may route information to a plurality of egress points of the stage. Similar to the embodiment shown in FIG. 8, the ingress point would include a first flow control regulator for monitoring and regulating the flow at the ingress point toward a first egress point and a second flow control regulator for monitoring and controlling the flow at the ingress point toward a second egress point. In addition, a first flow monitor would be located in the flow from the ingress point to the first egress point (e.g., at, upstream of, or downstream to the first egress point), and a second flow monitor would be located in the flow from the ingress point to the second egress point. In addition, where a stage comprises a plurality of egress points, the flow of information to at least one of the egress points may be managed, while the flow of information to at least one other egress point may not be managed, such as where congestion is less likely to occur or is less likely to cause significant disruption to an overall system (e.g., where the path in a stage is inherently fair).

The embodiments of the invention described herein are implemented as logical steps in one or more computer systems. The logical operations of the present invention are implemented (1) as a sequence of processor-implemented steps executing in one or more computer systems and (2) as interconnected software, machine, or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   determining, using a processor or a circuit module, a target bandwidth of at least one network traffic ingress point of multiple network traffic ingress points based on a congestion status of a network traffic egress point and a bandwidth status of each of the multiple network traffic ingress points;
   and regulating traffic of said at least one said network traffic ingress point based upon the target bandwidth;
   wherein the bandwidth status of said at least one network traffic ingress point is based on comparison of the bandwidth of said at least one said network traffic ingress point to a calculation based on the target bandwidth and a weight assigned to said at least one network traffic ingress point.

2. The method of claim 1 wherein the regulating operation comprises: multiplying the target bandwidth by the weight associated with said at least one network traffic ingress point.

3. The method of claim 1 wherein the congestion status of the network traffic egress point is determined by monitoring a buffer at the network traffic egress point.

4. The method of claim 3, wherein the buffer comprises a queue.

5. The method of claim 1 wherein the bandwidth status of said at least one network traffic ingress point comprises at least one of a restricted status, a limited status, and an under offered status.

6. The method of claim 1 wherein the bandwidth status of said at least one network traffic ingress point is determined at least in part by monitoring a buffer at the network traffic ingress point.

7. The method of claim 1 wherein the multiple network traffic ingress points comprises a plurality of input ports of a switch.

8. The method of claim 7 wherein the said network traffic egress point comprises an output port of the switch.

9. The method of claim 7 wherein the switch comprises a switch of a storage area network (SAN).

10. The method of claim 1 wherein the multiple network traffic ingress points and the network traffic egress point span a fabric of a storage area network (SAN).

11. The method of claim 1 wherein the bandwidth status of said at least one network traffic ingress point is communicated in-band.

12. The method of claim 1 wherein the bandwidth status of said at least one network traffic ingress point is communicated out-of-band.

13. The method of claim 1 wherein the bandwidth status is broadcast.

14. The method of claim 1 wherein the target bandwidth is broadcast to the multiple network traffic ingress points.

15. The method of claim 1 wherein the target bandwidth is communicated in-band.

16. The method of claim 1 wherein the target bandwidth is communicated out-of-band.

17. The method of claim 1, wherein at least one of the multiple network traffic ingress points target a second network traffic egress point and the network traffic egress point.

18. The method of claim 17, further comprising:
determining a second target bandwidth based on congestion status of the second network traffic egress point and a second bandwidth status of at least one of the multiple network traffic ingress points targeting the second network traffic egress point; and regulating traffic of the at least one of the multiple network traffic ingress points targeting the second network traffic egress point based upon the second target bandwidth.

19. A system comprising:
a plurality of flow control regulators each comprising an ingress buffer, wherein the buffer of each said flow control regulator is configured to communicate with a respective network traffic ingress point of a plurality of network traffic ingress points; and
a flow monitor configured to connect to a network traffic egress point wherein each of the flow control regulators is configured to determine a bandwidth status of one of the plurality of network traffic ingress points based upon monitoring traffic through the one of the plurality of network traffic ingress points and to transmit the bandwidth status to the flow monitor via a communication link and the flow monitor is configured to determine a target bandwidth based upon the bandwidth status of each of the plurality of network traffic ingress points and send a target bandwidth control signal to at least one flow control regulator via the communication link;
wherein the bandwidth status of said one of the plurality of network traffic ingress points is based on comparison of the bandwidth of said one of the plurality of network traffic ingress points to a calculation based on the target bandwidth and a weight assigned to said one of the plurality of network traffic ingress points.

20. The system of claim 19 wherein the communication link comprises an in-band communication link configured to carry information received at the plurality of network traffic ingress points to the network traffic egress point.

21. The system of claim 19 further comprising a second communication link configured to carry information received from at least one of the plurality of network traffic ingress points to the network traffic egress point, wherein each of the flow control regulators is configured to communicate with the flow monitor via the communication link out-of-band with the information carried by the second communication link.

22. The system of claim 19 wherein a stage including the network traffic egress point comprises a fabric of a storage area network (SAN), and the plurality of network traffic ingress points comprises a plurality of input ports of a switch, and the common network traffic egress point comprises an output port of the switch.

23. The system of claim 19 wherein the flow monitor comprises an egress buffer configured to communicate with the network traffic egress point.

24. The system of claim 19 further comprising a second flow monitor disposed downstream of at least one network traffic ingress point and upstream of the network traffic egress point, wherein the second flow monitor is configured to connect to the communication link.

25. The system of claim 24 wherein the second flow monitor intercepts target bandwidth representative information from the flow monitor.

26. The system of claim 19 wherein a stage including the network traffic egress point comprises a hierarchical switch.

27. The system of claim 19 wherein the flow control regulators monitor traffic via a buffer.

28. A system comprising:
a first means for determining a bandwidth status of a plurality of network traffic ingress points and for regulating traffic of the plurality of network traffic ingress points;
a second means for determining a congestion status of a network traffic egress point and for determining a target bandwidth based on the congestion status of the network traffic egress point and the bandwidth status of the plurality of network traffic ingress points;
a communication link for connecting the first means and the second means, wherein the first means is configured to regulate the traffic of the plurality of network ingress points based upon the target bandwidth, and
wherein the bandwidth status of one of the plurality of network traffic ingress points is based on comparison of the bandwidth of said one of the plurality of network traffic ingress points to a calculation based on the target bandwidth and a weight assigned to said one of the plurality of network traffic ingress points.

29. A method comprising:
determining, using a processor or a circuit module, a first target bandwidth based on a first congestion status of a first network traffic egress point and a bandwidth status of a network traffic ingress point;

determining a second target bandwidth based on a second congestion status of a second network traffic egress point and the bandwidth status of the network traffic ingress point; and regulating traffic based upon at least one of the first target bandwidth and the second target bandwidth depending upon the bandwidth status of the network traffic ingress point;

wherein the bandwidth status of the network traffic ingress point is based on comparison of the bandwidth of the network traffic ingress point to a calculation based on the target bandwidth and a weight assigned to the network traffic ingress point.

30. The method of claim 29 wherein the second network traffic egress point is disposed downstream of the first network traffic egress point.

31. The method of claim 30 wherein the regulating operation is performed based upon the first target bandwidth if the bandwidth status of the network traffic ingress point is restricted.

32. The method of claim 30 wherein the regulating operation is performed based upon the second target bandwidth if the network traffic bandwidth status of the ingress point is not restricted.

33. The method of claim 1 wherein the operation of regulating traffic comprises regulating traffic from the at least one said network traffic ingress point based upon the target bandwidth.

34. The method of claim 1, further comprising determining the bandwidth status of the at least one said network traffic ingress point based on comparison of the bandwidth of the at least one network traffic ingress point to an offered bandwidth of the at least one said network traffic ingress point.

* * * * *